United States Patent [19]
Ross et al.

[11] Patent Number: 5,419,457
[45] Date of Patent: May 30, 1995

[54] SYSTEM FOR SORTING MAIL PIECES ON MULTIPLE LEVELS AND A METHOD FOR PERFORMING THE SAME

[75] Inventors: Gerald D. Ross, Streamwood; Robert E. Sadler, Jr., Des Plaines; John M. Buday, Jr., Des Plaines; Gunther A. Dorth, Des Plaines; David Novak, Hanover Park, all of Ill.

[73] Assignee: ElectroCom Gard Ltd., Niles, Ill.

[21] Appl. No.: 113,235

[22] Filed: Aug. 30, 1993

[51] Int. Cl.⁶ .............................................. B07C 5/36
[52] U.S. Cl. ................................. 209/616; 209/584;
209/900; 271/2; 271/198; 271/300; 271/184;
53/250; 198/357; 198/367; 198/799; 198/800;
414/789.9; 414/790.6
[58] Field of Search .................... 271/2, 279, 292, 294,
271/297, 299, 300, 307–308, 312, 190, 213, 214,
198, 184, 305; 53/250; 209/584, 615, 616, 653,
900; 414/276, 789.9, 790.5, 790.6; 198/367,
475.1, 799, 800, 357

[56] References Cited

U.S. PATENT DOCUMENTS

| | | |
|---|---|---|
| 2,369,840 | 2/1945 | Nalbach et al. . |
| 2,764,275 | 9/1956 | Lens . |
| 2,886,166 | 5/1959 | Lens . |
| 2,983,392 | 5/1961 | Ebbert ................................ 414/276 |
| 3,018,872 | 1/1962 | Wittenberger . |
| 3,080,040 | 3/1963 | Estabrooks et al. . |
| 3,303,916 | 2/1967 | Burt .................................. 198/357 X |
| 3,463,298 | 8/1969 | Harrison . |
| 3,807,553 | 4/1974 | Billett et al. ................. 414/789.9 X |
| 3,884,370 | 5/1975 | Bradshaw et al. . |
| 3,915,531 | 10/1975 | Morgan . |
| 3,960,264 | 6/1976 | Carbine et al. . |
| 4,067,437 | 1/1978 | Frantl et al. . |
| 4,161,095 | 7/1979 | Buday ............................... 53/250 X |
| 4,273,491 | 6/1981 | Roux ................................. 53/250 X |
| 4,503,977 | 3/1985 | Kohno et al. . |
| 4,520,447 | 5/1985 | Nara . |
| 4,892,179 | 1/1990 | Lassiter, Jr. et al. . |
| 4,961,488 | 10/1990 | Steeghs .............................. 198/357 |
| 4,993,535 | 2/1991 | Scata . |
| 5,086,929 | 2/1992 | Richter et al. . |
| 5,090,552 | 2/1992 | Fukuyama et al. . |
| 5,293,983 | 3/1994 | Grapes et al. .................. 209/900 X |

FOREIGN PATENT DOCUMENTS 202249  11/1983  Japan .................................. 271/213

OTHER PUBLICATIONS

Vaitys, R. P., "Advanced Transport/Stacker Development", as published for U.S. Postal Service Advanced Technology Conference, Oct. 21–23, 1986, pp. 609–619.
Buday, John M., "Advanced Transport Stacker–Live Mail Test", as published for U.S. Postal Service Advanced Technology Conference, May 3–5, 1988, pp. 494–505.
Buday, John M., "Advanced Transport Stacker–Live Mail Test", as published in *International Journal of Research & Engineering*, Inaugural Issue, 1989, pp. 93–97.
Klima, Richard, "Flat Mail Test Bed", as published for U.S. Postal Service Advanced Technology Conference, Nov. 5–7, 1990, pp. 675–689.

*Primary Examiner*—James R. Bidwell
*Assistant Examiner*—Boris Milef
*Attorney, Agent, or Firm*—Hill, Steadman & Simpson

[57] ABSTRACT

A system and a method for sorting are provided for distributing articles, such as mail pieces or other flats, to predetermined destinations. At the destination, the particular article is raked by a raking assembly from a carrier for placement into a container. The container, when full, is gravity fed onto a discharge conveyor and automatically replaced with a new empty container. The carrier operates on two levels for delivery of articles to containers on two levels while maintaining the carriers in a horizontal position throughout the sorting process. A sloped front end of the carrier allows the articles to be transported at a rapid speed and in a continuous fashion.

13 Claims, 5 Drawing Sheets

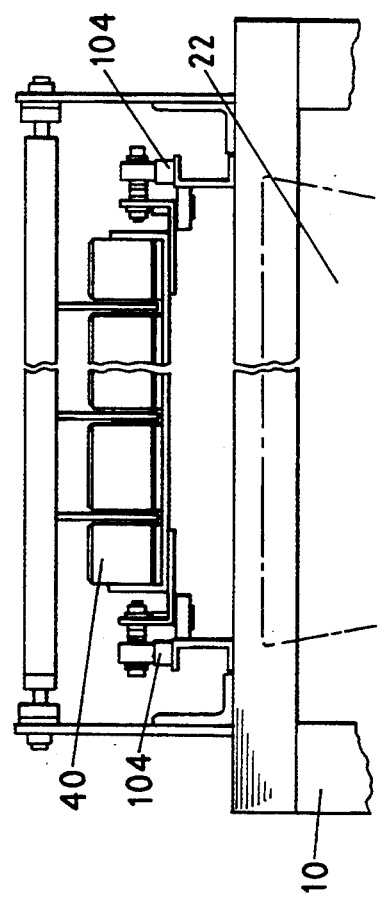
FIG. 3
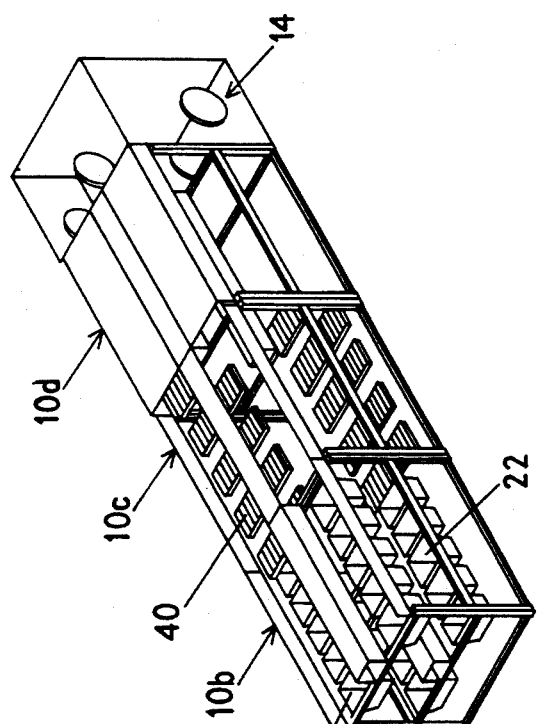
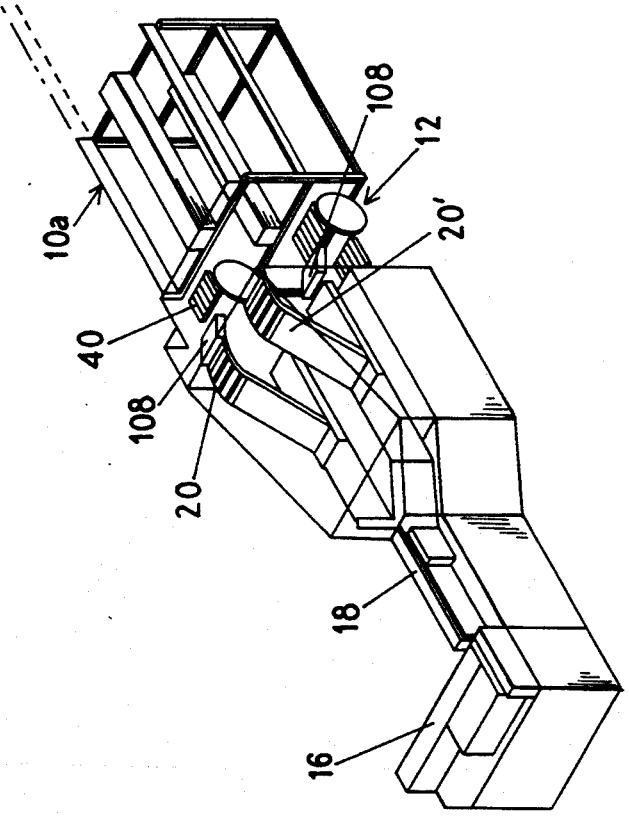
FIG. 1

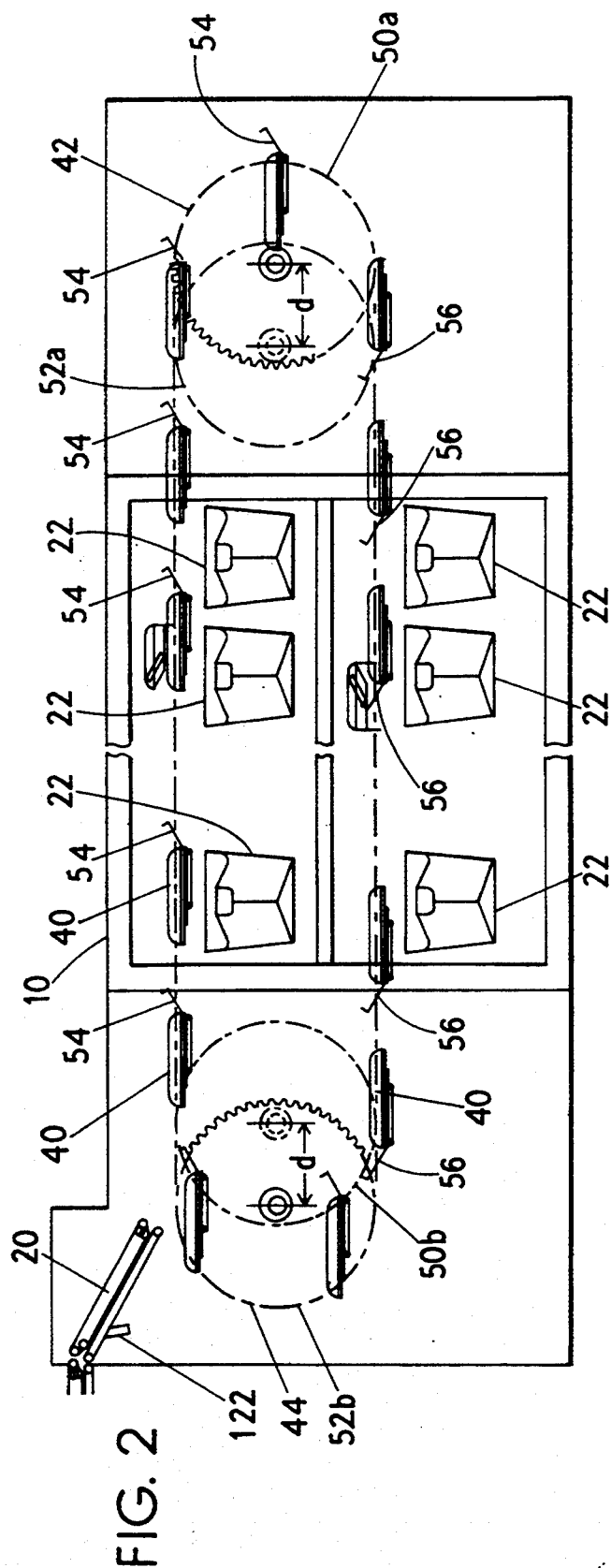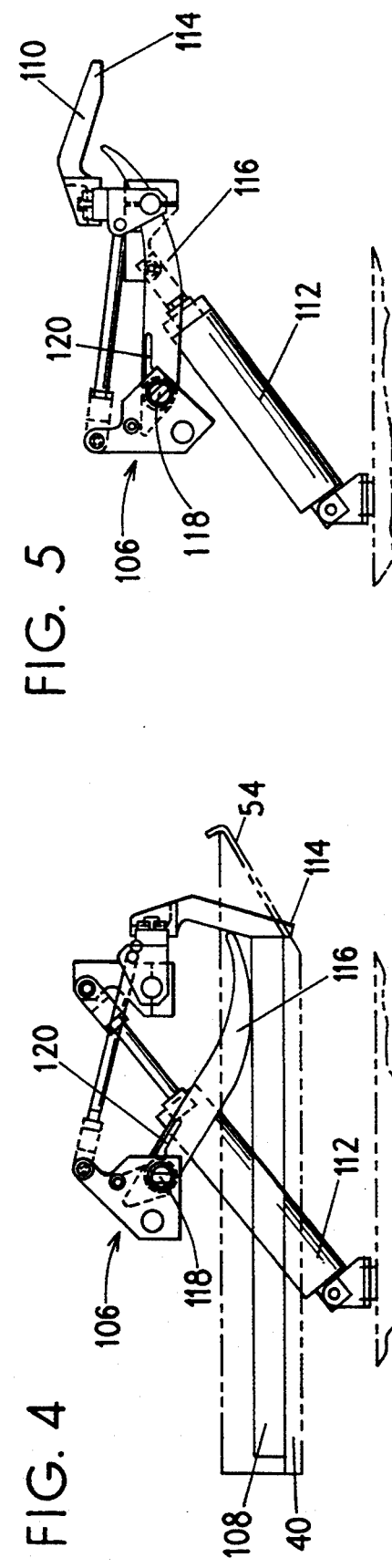

SYSTEM FOR SORTING MAIL PIECES ON MULTIPLE LEVELS AND A METHOD FOR PERFORMING THE SAME

BACKGROUND OF THE INVENTION

The present invention generally relates to a system and a method for sorting articles. More specifically, the present invention relates to transporting of mail pieces to destinations on more than one vertical level for sorting.

It is, of course, known to deliver mail pieces to a plurality of destinations based on predetermined requirements, such as a particular zip code, for example. However, current operational systems require a significant amount of floor space in order to implement the sorting process. The floor space, commonly referred to as a "foot print", for current systems requires space for the machine itself, space for access to the machine, and space for staging of input and output mail.

One such system is known and generally illustrated in U.S. Pat. No. 4,503,977 to Kohno et al.

The '977 patent requires a significant amount of floor space to implement the sorting of mail to a plurality of stacking bins. The bins are arranged in a row as a result of optically scanning and reading zip codes on the mail. Whenever a predetermined amount of mail is stacked in a stacking bin, the mail is transferred to a conveyance section. When the sorting operation has ended, the mail sorting apparatus detects if any mail exists on the conveyance section. This operation continually repeats until all mail is removed from the stacking bins.

Another system for sorting and processing of mail pieces is shown in U.S. Pat. No. 3,884,370 to Bradshaw et al. The system disclosed in the '370 patent includes mechanical carriers magnetically encoded with sort destinations to transport and remain with respective items through a processing cycle. A monorail conveyor distribution system has a three-dimensional suspension system consisting of belts to provide transport, storage, switching and supporting of carriers during the processing operation.

As is apparent in the '370 and '977 patents, a significant amount of floor space is required for providing mail sorting operations. Further, these prior art mail sorting systems are inefficient in terms of handling of mail pieces as well as time required for conducting a sorting operation.

A need, therefore, exists for an improved system and method for sorting articles, particularly mail pieces.

SUMMARY OF THE INVENTION

The present invention provides a system and a method for sorting articles, such as mail pieces, transported about a plurality of carriers secured between a pair of chains. Sprockets assisting in rotation of the chains are horizontally displaced at turnaround points to enable rotation of each carrier in a horizontal fashion on two levels.

To this end, in an embodiment, the present invention provides a system for sorting mail pieces comprising a first pair of sprockets secured at a predetermined distance therebetween. A second pair of sprockets is secured at the predetermined distance therebetween wherein the second pair of sprockets are longitudinally and laterally displaced from the first pair of sprockets. A first transport chain is mounted to rotate about the first pair of sprockets and a second transport chain is mounted to rotate about the second pair of sprockets. A plurality of carriers are secured by supporting opposite sides of each carrier between the first and second transport chains to maintain each of the plurality of carriers in a horizontal position between two levels during transport of the plurality of carriers. A first plurality of bins are stacked between the first pair of sprockets and the second pair of sprockets to receive the mail pieces from the carriers. A rake assembly above each of the plurality of bins removes a designated mail piece from at least one of the carriers into one of the bins.

In an embodiment, the system comprises a second plurality of bins stacked individually behind the first plurality of bins for replacement of each of the first plurality of bins.

In an embodiment, the system comprises a plurality of sensors corresponding to the first plurality of bins for detecting when each of the first plurality of bins is full.

In an embodiment, the system further comprises a sensor for monitoring for presence or absence of an article on each of the plurality of carriers.

The present invention further provides a method for sorting mail pieces. The method comprises the steps of feeding the mail pieces onto a plurality of carriers wherein each of the carriers is horizontally secured to hold at least one mail piece; transporting the mail pieces on each of the carriers wherein the transporting occurs on two horizontal planes; and removing one of the mail pieces from the carriers into at least one of a plurality of bins during transport wherein each of the mail pieces is designated for a specific bin.

In an embodiment, the method further comprises the step of sensing level of fill of each of the plurality of bins. Further, upon sensing of a full condition, the method further comprises the step of removing the bin. In addition, the method comprises the step of automatically replacing the removed bin with a new bin.

In an embodiment, the method comprises the step of sensing for removal of each mail piece from each of the plurality of carriers.

The present invention further provides a carrier for transporting at least one article for delivery of the at least one article to at least one of a plurality of destinations wherein the destinations are divided into at least two levels. The carrier comprises a platform having a forward end and a rear end for horizontally transporting the at least one article. Alternating front sloped ends are provided each maneuverable between a first position at the forward end of the platform and a second position at the rear end of the platform wherein the first position is effected during transport on a first delivery level and the second position is effected during transport on a second delivery level.

In an embodiment, the carrier has two side walls each forming right angles with the platform wherein the side walls include two radiused grooves for receiving the alternating front sloped ends. Each of the side walls further comprises a cam plate rotating between the first position and the second position to effect the positioning of the alternating front ends.

In an embodiment, the side walls further comprise a follower plate having a first horizontal groove and a second horizontal groove, the second horizontal groove receiving a shaft connected to a bottom side of the platform for assisting in effecting alternating of the front sloped ends.

In an embodiment, the carrier comprises a lip at a leading end of each of the front sloped ends perpendicular to a surface of the front sloped end.

In an embodiment, a back side of the platform opposite the side carrying the article includes a bracket with hinged elements connecting the front sloped ends to the back side. The bracket on the back side is spring loaded.

In an embodiment, opposite diagonal corners of the platform are connected to transport chains. Horizontal distance between the opposite diagonal corners is predetermined.

It is, therefore, an advantage of the present invention to provide a system for sorting mail articles.

It is another advantage of the present invention to provide a system for sorting articles on at least two levels.

A still further advantage of the present invention is to service two stacking levels with a single transport chain drive.

Yet another advantage of the present invention is to provide a system for continuously sorting articles to a plurality of destinations.

A further advantage of the present invention is to provide a system and a method for removing articles from a carrier in a continuous fashion on two levels.

Another advantage of the present invention is to provide a system and a method for sorting articles on two levels at a minimal height.

Moreover, an advantage of the present invention is to provide a system and a method for recirculation of articles to both levels.

And, an advantage of the present invention is to provide a system and a method for automatic unloading of full containers.

Further, an advantage of the present invention is to provide a system and a method for monitoring of articles as the articles are continuously fed to destinations.

Moreover, an advantage of the present invention is to provide a carrier for transporting one or more articles to a destination.

Yet another advantage of the present invention is to provide a carrier which may be implemented on more than one level.

A still further advantage of the present invention is to provide a system and a method for sorting on two levels using a carrier with reversible sloped front ends wherein the reversal is accomplished at a turnaround point in a smooth and quiet transition.

Further, an advantage of the present invention is to provide a carrier for an article with a reversible sloped front end wherein the reversal occurs without disruption of the article on the carrier.

Moreover, an advantage of the present invention is to provide a carrier which aids in retaining an article on the carrier at all positions on a two-level system.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective view of the system of the present invention for sorting articles, such as individual mail pieces or "flats."

FIG. 2 illustrates an elevational view of the system of the present invention.

FIG. 3 illustrates a cross-sectional view of a portion of the system of the present invention.

FIG. 4 illustrates an elevational view of a rake assembly for use in the system for sorting articles of the present invention.

FIG. 5 illustrates the rake assembly of FIG. 4 in its raised or retracted position.

DETAILED DESCRIPTION OF THE PRESENTLY PREFERRED EMBODIMENTS

Figure 6:
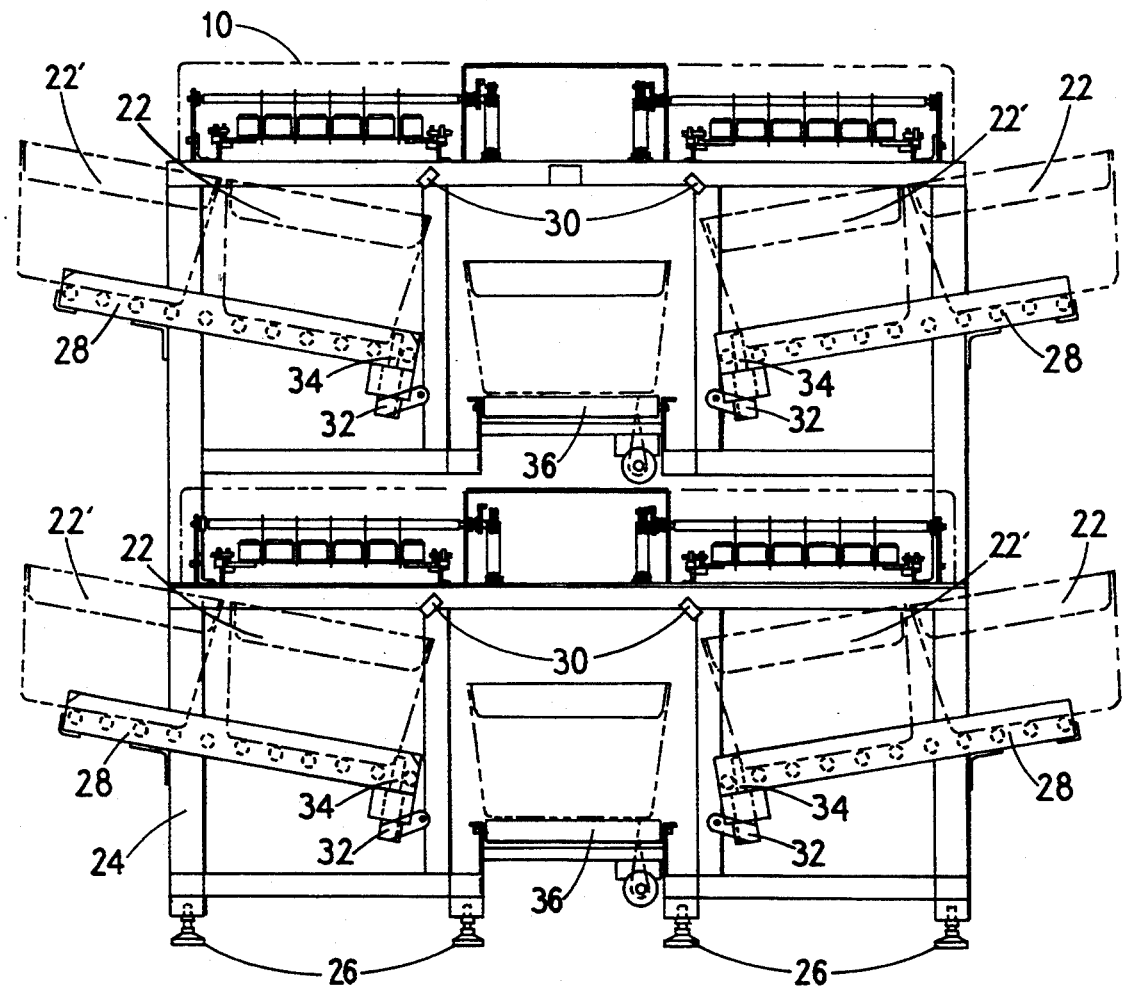
FIG. 6 illustrates an elevational view of automatic feeding of containers for the system of the present invention.

The present invention relates to a sorting system for distributing articles, such as mail pieces or "flats", incorporating two vertical levels of sorting bins or containers for receiving the articles. The mail articles or flats are presented to both levels of sorting bins by carriers incorporating a reversible leading edge allowing sorting to both of the levels using only a single pair of transport chains and a single transport chain drive.

The sorter incorporates vertical arrays of stacking containers, and a transport carrier system translates directly above the bins within the width of the bins. Therefore, the sorter only requires a minimal amount of floor space or "foot print". It should be understood that the present invention relates to the sorter and the carrier assembly. Therefore, a specific feeder for input of articles or flats to the carrier for distribution by the sorter into bins are shown for reference only. The sorter can be interfaced with a wide variety of feeders and should not be limited by a particular feeder.

Referring now to the drawings, FIG. 1 generally illustrates a system 1 for sorting articles, such as flats, to a variety of destinations. Stacker modules 10a, 10b, 10c and 10d (hereinafter referred to as stacker modules 10) are illustrated in FIG. 1. It should be understood that any number of stacker modules 10 may be used in the system 1 for the particular application of article sorting required.

The system 1 includes a powered turnaround unit generally illustrated at 12 and an idler turnaround unit generally illustrated at 14. Input to the sorter system 1 is provided by a feeder generally illustrated at 16. The feeder 16 may feed articles to, for example, a bar code reader 18 or other identification device and finally to one of a pair of two-level in-line inserters 20, 20'.

The stacker modules 10 each consist of ten stacking containers 22 per level or twenty stacking containers 22 per stacker module 10. The stacking containers 22 are most clearly shown in the module 10b. The stacking containers 22 are arranged in a side-by-side configuration to provide maximum sortation density for the system 1. It is within the purview of the present invention to provide any number of stacking containers 22 within each of the stacker modules 10 based on the particular application. As shown in FIG. 1, the stacker modules 10a, 10b, 10c and 10d each provide twenty stacking destinations. The destinations are provided by the containers 22 within each of the modules 10. Therefore, eighty stacking destinations are provided for the system 1 illustrated in FIG. 1.

The stacking containers 22 may be standard United States Postal Service-type containers for receiving mail pieces, but any particular container configuration may be implemented by those skilled in the art. As previously mentioned, the system 1 provides complete modularity in terms of the number of modules 10 or the number of containers 22 which may be required for a specific processing facility. That is, the system 1 as shown in FIG. 1 may be increased or decreased by increments of twenty containers 22. That is, addition of a stacker module 10 provides up to twenty more destinations while removal of a module 10 in the system 1 eliminates as many as twenty containers 22.

The system 1, therefore, provides a side-by-side, two-high packaging of the containers 22. The stacker modules 10 present a maximized cube configuration offering an operator easy access to all elements of the system 1. The turnaround units 12 and 14 at each end of the system 1 are designed to maintain horizontal attitude of carriers (described hereinafter) at all times during transport of the carriers through the system 1. Further, only the powered turnaround unit 12 implements a drive (not shown) for rotating transport chains for the system 1.

Referring now to FIG. 2, a single stacker module 10 is shown in fragmentary, sectional view. The module 10 incorporates a plurality of containers 22. The containers 22 may be arranged in side-by-side columns with a plurality of containers 22 on each of two levels.

An end view of a typical stacker module 10 is generally shown in FIG. 6. A support frame 24 is provided having a rigid frame and adjustable feet 26 thereby providing an aligned module-to-module formation. The containers 22 are supported by gravity rollers 28, but may also be supported by other means, such as by sliding chassis-type extensions. The gravity rollers 28 are of a suitable length and width to allow feeding of at least two containers 22, 22' to the receiving position as shown by the position of the carriers 22.

An optical sensor 30 or other sensing device may be implemented for sensing fullness of each of the containers 22. When a particular container 22 is sensed as full, a latch mechanism 32 receives a signal which releases a stop 34 allowing the full container 22 to be released to a discharge conveyors 36. Further, two powered roller discharge conveyors 36 are provided, one per sort level. Each discharge conveyor 36 is routed inbetween the adjacent sorting stations. The discharge conveyors 36 are at an angle with respect to the gravity rollers 28 holding the two containers 22, 22'.

The first container 22 is in the receiving or filling position directly under the path of transport carriers, and the other container 22' is in a make-up position immediately uphill on the gravity rollers 28. When the optical sensor 30 detects a full container 22' such as by use of an infrared convergent beam, the sensor 30 generates a signal provided to a control unit (not shown) indicating the container 22 is full and requires replacement. The signal from the sensor 30 initiates retraction of the stop 34 allowing the full container 22 to gravity roll into the discharge conveyor 36. The trailing empty container 22' then gravity rolls into the just-vacated filling position and is stopped by the re-extension of the stop 34.

Output of both discharge conveyors 36 is provided to a point outside of the system 1 for, for example, manual removal. In the alternative, automatic conveyor takeaway systems, automatic tagging and/or automatic palleting may also be provided. After the second container 22' is provided in the filling position, an operator or other feeding mechanism, manual or automatic, may provide a new empty container in the make-up position uphill from the new container in the filling position which is beneath the transport carriers.

Figure 7:
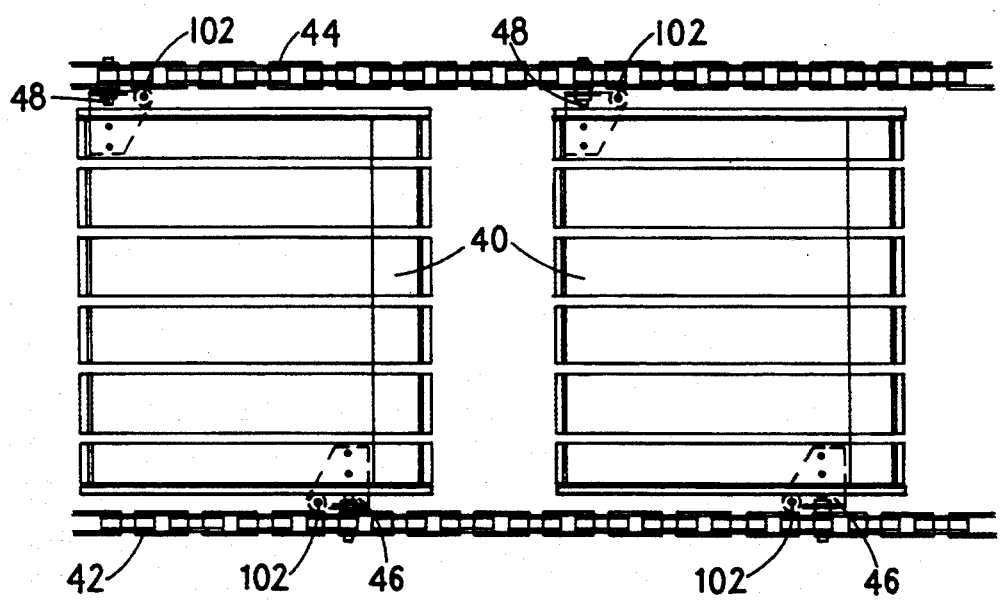
FIG. 7 illustrates a plan view of carriers of the present invention as the carriers are rotated about transport chains of the system of the present invention.

Referring again to FIG. 2 and to FIG. 7, carriers 40 are shown transporting about a path between a set of transport chains 42, 44 for sorting on two levels. The carriers 40 are connected to the transport chains 42, 44 in an offset position. The distance between attachment points 46, 48 for each of the carriers 40 connected to the transport chains 42, 44 is equal to a distance d shown in FIG. 2 corresponding to an offset between sprockets 50a, 52a or, in the alternative, the offset between sprockets 50b, 52b.

The sprockets 50a, 50b transport the chain 42, and the sprockets 52a, 52b transport the chain 44. The sprockets 50b, 52b and hence the transport chains 42, 44 are driven by a single drive device (not shown) located at the turnaround unit 12. As a result of this specific configuration, the carriers 40 are maintained horizontally as the carrier 40 rotates around the sprockets 50a, 52a as well as the sprockets 50b, 52b.

The carriers 40 further include a leading sloped end 54 as shown on the top level of the two level module 10 shown in FIG. 2. The leading sloped end 54 on the top level is reversed to a reversed leading sloped end 56 on the bottom level of the two-level stacker module 10. The reversal of the leading sloped end 54 of the carrier 40 to the reverse leading slope end 56 occurs during negotiation of the sprockets 50a, 52a. The reverse leading sloped end 56 is similarly converted to the leading sloped end 54 during negotiation of the sprockets 50b, 52b.

The transitional movement of the sloped ends is performed simply, smoothly and quietly. In addition, disturbance to the transported article is minimal to non-existent. To this end, the transitional movement of the sloped end is achieved over a large path (i.e. 180°) resulting in a turnaround having a smooth and quiet transition. The simplistic transitional movement of the sloped ends 54, 56 of the carrier 40 is critical due to the number of carriers 40 utilized in the transport of articles.

Figure 8:
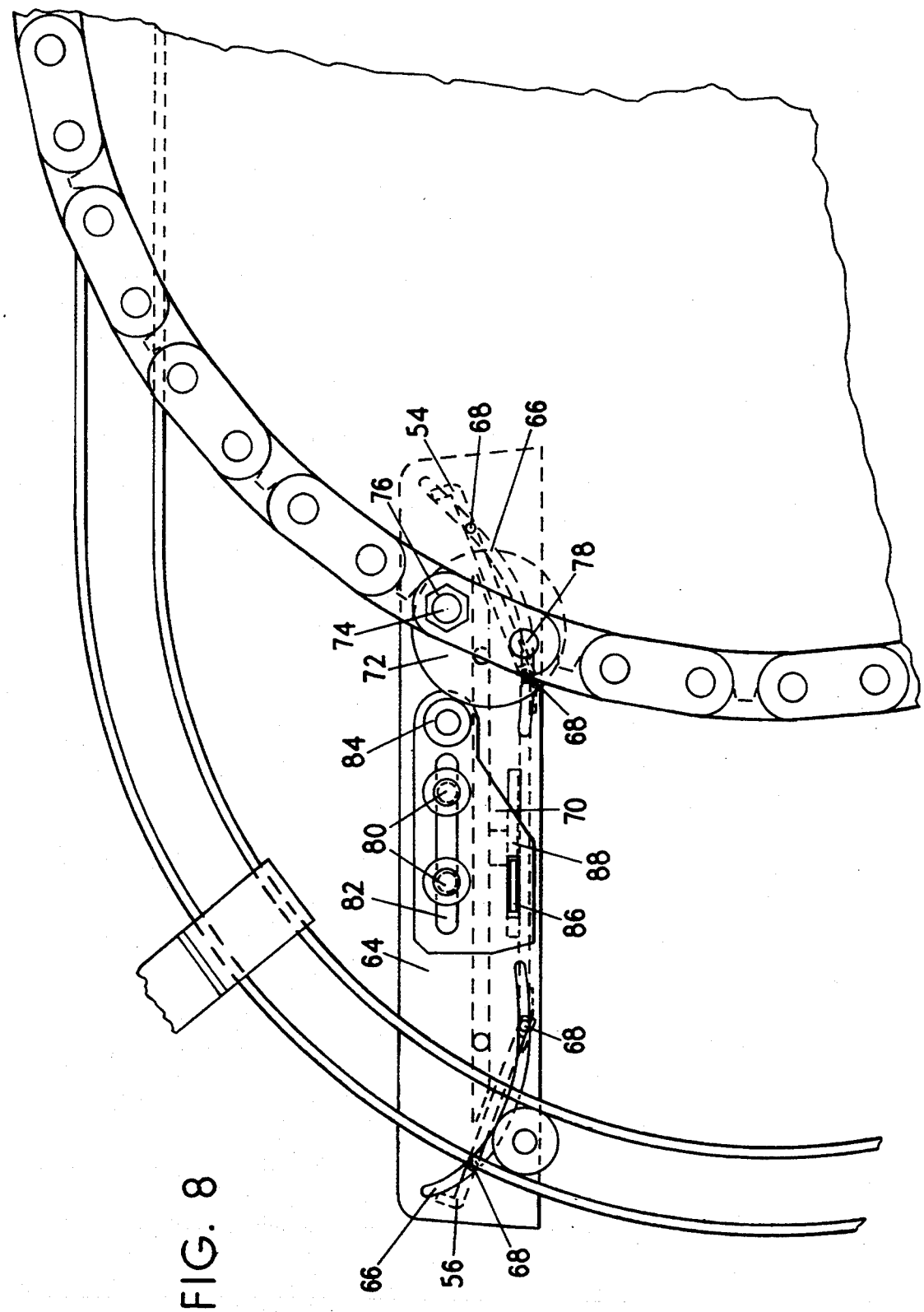
FIG. 8 illustrates an enlarged fragmentary view of a carrier transposed at turnaround point at an end of the system of the present invention.
Figure 9:
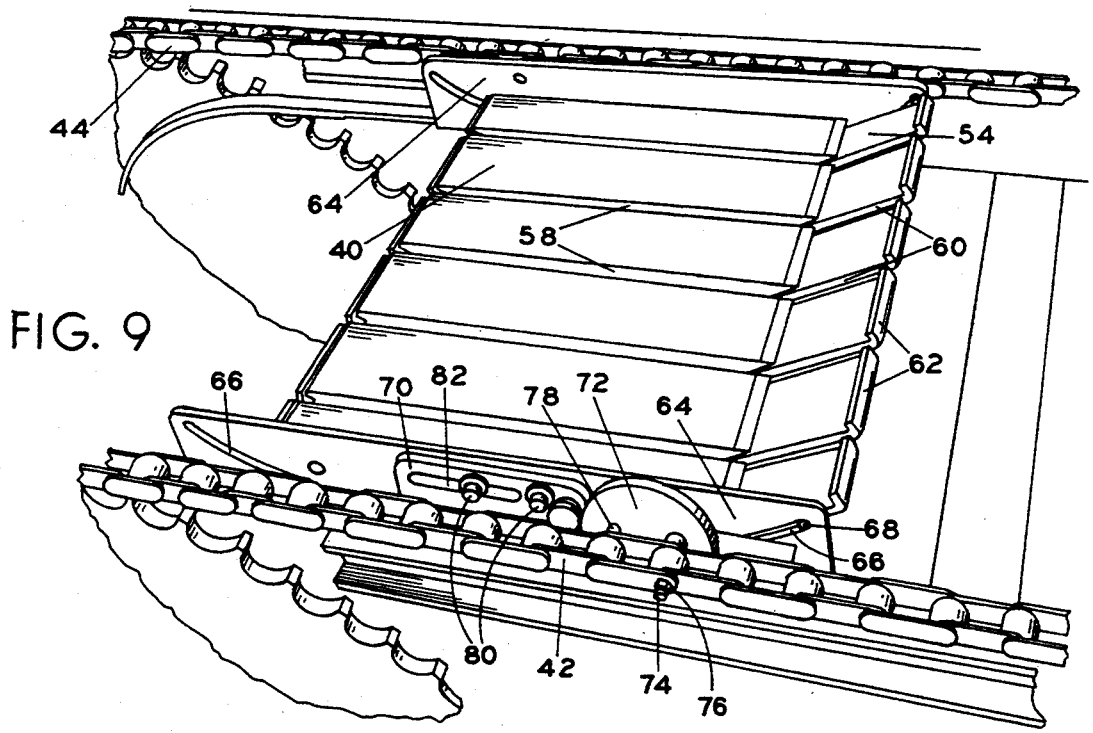
FIG. 9 illustrates a fragmentary perspective view of a carrier assembly for use with the system of the present invention.
Figure 10:
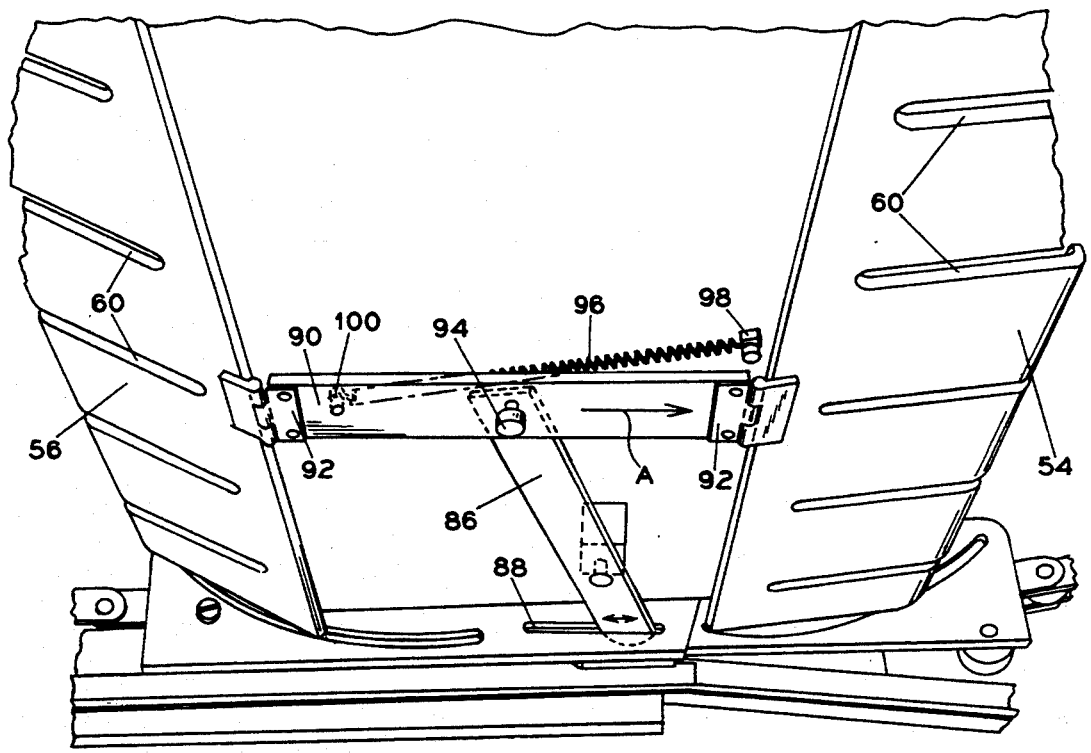
FIG. 10 illustrates a fragmentary bottom view of a carrier assembly for use with the system of the present invention.

Referring now to FIGS. 8–10, the translational movements of the sloped ends 54, 56 will be described. The carrier assembly 40 is shown traveling in a horizontal sorting path secured at diagonal corners to the transport chains 42, 44. A base of the carrier 40 incorporates parallel grooves 58 which receives passage of rake fingers 110 of a rake assembly 106 for removal of the article transported by the carrier 40. The specific features of the rake assembly 106 including the rake fingers 110 will be later described with reference to FIGS. 4 and 5.

The sloped front end 54 of the carrier 40 is extended in the direction of motion of the carrier 40, and the trailing sloped end 56 is retracted when the carrier is moving in the particular direction shown in FIG. 9. The retracted position of the sloped end 54, 56 is beneath the base of the carrier 40.

When the carrier 40 translates through the turnaround unit, the sloped front ends 54, 56 are automatically reversed to accommodate the change in travel of the carrier 40 on the next sorting level of the stacker module 10. Both sloped front ends 54, 56 incorporate open slotted grooves 60 corresponding to the grooves 58 in the base of the carrier 40. The sloped front ends 54, 56 each also incorporate a return flange 62. The return flanges 62 create beneficial air flow during operational velocities of the system 1, i.e. during sorting.

On each of the sides of the base of the carrier 40 perpendicular to the sloped ends 54, 56 is a vertical side plate 64. The vertical side plates 64 include a pair of radiused slots 66 located at the front end and the rear end of the vertical side plates 64. The radiused slots 66 provide a guide for the sloped front ends 54, 56 during the reversal process negotiated at the turnaround units 12, 14. Pin extensions 68 are located on the outboard edge of the sloped ends 54, 56 to track within the radiused slots 66 of each side plate 64. A follower plate 70 and a cam plate 72 are mounted on the side plates 64 of the carrier 40 as shown in FIGS. 8 and 9.

Operation of the follower plate 70 and the cam plate 72 is most clearly shown with reference to FIG. 8. The cam plate 72 is a circular-shaped plate attached to the transport chain 42 through a hollow rivet of the transport chain 42 in one common link. One end of the link includes a bolt 74 including attachment of a nut 76. The other end of the link is secured through attachment of a rotary pin 78.

The follower plate 70 is retained to the side plate 64 of the carrier 40 by two shoulder bolts 80. The follower plate 70 includes a first horizontal slot 82 allowing the plate 70 to translate forward and backward as guided and retained by the shoulder bolts 80 within the first horizontal slot 82. The end of the follower plate 70 nearest the cam plate 72 includes a cam tracking roller 84 provided in continuous contact with the cam plate 72 during operation of the system 1.

Continuous contact of the cam tracking roller 84 to the cam plate 72 is accomplished by spring loading the follower plate 70 against the cam plate 72. Spring pressure is applied through the combination shown in FIG. 10. The link plate 86 protrudes slightly through a second horizontal slot 88 in the follower plate 70. Therefore, the sloped front ends 54, 56 are mechanically attached to a connector plate 90 by means of two hinges 92. The link plate 86 includes a pivot shaft 94 attached to a center of the connector plate 90 on one end of the link plate 86. The link plate 86 at the opposite end extends through the first horizontal slot 82 in the follower plate 70. The sloped front ends 54, 56 and the connector plates 90 are spring loaded by a spring 96 as shown by the direction indicated by the arrow labelled "A" in FIG. 10. The extension spring 96 fastens to an underside of the carrier 40 at one end by a fastener 98 and by a fastener 100 at the opposite end of the connector plate 90.

The linkage arrangement results in constant engagement of the cam plate 72 with the cam tracking roller 84 during the carrier travel path around the turn-around units 12, 14 between both sorting levels of the modules 10. The sloped front ends 54, 56 are, therefore, reversed on a 180° rotation path at both turn-around units 12, 14. As a result, the carrier 40 remains parallel to a floor on which the system 1 is placed during the entire rotation of the carrier 40. The cam plate 72, however, continues to rotate 180° around the sprockets in respect to the carrier 40 at each of the respective turnaround units 12, 14.

The 180° rotation of the cam plate 72 results in a lateral translation of the sloped front ends 54, 56 on each turnaround unit 12, 14. The extension of the sloped front ends 54, 56 is maintained by the cam plate 72 while the carrier 40 travels along both horizontal sorting levels. During the horizontal traveling of the carrier 40, the cam tracking roller 84 engages the cam plate 72 on a common center line with the attachment bolts 74.

Referring to FIG. 3, the carrier 40, as previously described, is attached on both sides to transport chains 42, 44. The attachment points 46, 48 may also include guide wheels 102. The transport chains 42, 44 are supported by a track 104 mounted to a frame of the stacker module 10. The guide wheels 102 are incorporated to maintain a lateral positioning of the carrier 40 and alignment with the rake assembly 106 to be described hereinafter. Each of the carriers 40 is offset mounted between the two transport chains 42, 44 to allow for maintaining of a horizontal attitude when negotiating the turnaround units 12, 14. Further, the carriers 40 are attached to the chains 42, 44 at an equal pitch. The velocity of the carriers 40 during operation of the system 1 is variable and is dependent on the throughput required for the system 1.

Referring to FIGS. 4 and 5, the rake assembly 106 is generally shown in both a raking position (FIG. 4) and a raised or retracted position (FIG. 5). In the retracted position illustrated in FIG. 5, the carrier 40 and an article 108, such as a mail piece, "flat", or the like, resting on the carrier 40 is free to pass under a rake finger 110. Each of the rake assemblies 106 is positioned at a point above each of the containers 22 so as to sweep off the article 108 when the article is above the appropriate container 22 as determined by a control unit.

Each rake assembly 106 may include a plurality of rake fingers 110 which are spaced such that when the rake fingers 110 are in the raking position, the fingers 110 penetrate through the slots 58 of the carriers 40 as well as through corresponding slots 60 of the forward sloped ends 54, 56. As the carrier 40 moves forward along the track 104, at an appropriate moment as determined by the control unit, a rake actuator 112 is initiated. The rake actuator 112 may be, for example, an air cylinder, which motion is initiated forcing the rake assembly 106 to rotate in the extended or down position such that the rake fingers 110 extend vertically.

In the extended position, the tips 114 of the rake fingers 110 pass through the slots 58 in the base of the carrier 40 and/or the slots 60 in the sloped ends 54 or 56. With the tips 114 passing through the slot 58 and/or 60, the rake fingers 110 force the article 108 to slide off the carrier 14 through its open side, and the article 108 gravity falls into the particular receiving container 22 therebelow. An edge of the article 108, however, often engages the sloped front wall 54 or 56 of the carrier 40. The engagement of the article 108 with the sloped front wall 54, 56 enhances a positive entry of the diverted article 108 into the container 22. The articles 108 are stacked in the containers 22 on their leading or "inboard" edges of the article 108.

An article retarder 116 is further provided with the rake assembly 106 consisting of a shaft linked to a rake shaft 118 with a spring 120 allowing accommodation of articles of varying thicknesses. The retarder 116 mitigates the impact between the article 108 and the rake fingers 110 by pinching the leading edge of the article 108 slightly. The pinching suppresses the tendency of the article 108 to bounce back upon impact. Bouncing back of the article 108 is detrimental to stacking of the article 108 in the containers 22.

In operation, the system 1 transfers and feeds articles to the carriers in a continuous fashion. The carriers 40 transport the mail pieces on the carrier 40 to a predetermined destination. The destinations may be arranged, for example, by zip code, such as for specific mail applications. The transporting of the articles on the carriers 40 is performed on two levels with each of the carriers 40 always maintaining a horizontal transport throughout its cycle.

The articles are swept into an appropriate container 22 as controlled by a control unit. The system 1 further controls feeding of new articles to empty carriers 40 when an empty carrier 40 is passed by the inserter 20. In addition, the system 1 monitors for articles which have not been delivered to any destination after a particular pass. The system 1 further verifies that the carrier 40 is empty prior to feeding as well as verifying that the carriers 40 are being emptied by incorporating an additional sensor 122 near the feeder 16 and the inserter 20. The sensor 122 provides a signal to the control unit of the system 1 indicative of whether each of the carriers 40 have been emptied and no longer contain an article. If emptied, a new article may be fed to the carrier 40. If the carrier 40 is not emptied after repeated passes, the system 1 may require interruption to determine the cause for non-removal.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim as our invention:

1. A system for sorting mail pieces, the system comprising:
    a first pair of sprockets secured at a predetermined distance therebetween;
    a second pair of sprockets secured at the predetermined distance therebetween wherein the second pair of sprockets are longitudinally and laterally displaced, but not vertically displaced, from the first pair of sprockets;
    a first transport chain mounted to rotate about the first pair of sprockets;
    a second transport chain mounted to rotate about the second pair of sprockets;
    a plurality of carriers secured by supporting opposite sides of each carrier between the first transport chain and the second transport chain to maintain each of the plurality of carriers in a horizontal position between two levels during transport of the plurality of carriers;
    a first plurality of bins stacked between the first pair of sprockets and the second pair of sprockets to receive the mail pieces from the carriers; and
    a rake assembly above each of the plurality of bins for removing a designated mail piece from at least one of the carriers into one of the bins.

2. The system of claim 1 further comprising:
    a second plurality of bins stacked individually behind the first plurality of bins for replacement of each of the first plurality of bins.

3. The system of claim 1 further comprising:
    a plurality of sensors corresponding to the first plurality of bins for detecting when each of the first plurality of bins is full.

4. The system of claim 1 further comprising:
    a sensor monitoring for presence or absence of an article on each of the plurality of carriers, the sensor constructed and arranged remotely from each of the plurality of carriers.

5. The system of claim 1 wherein the rake assembly further comprises:
    a retarder for securing the mail piece on the carrier.

6. The system of claim 1 wherein the plurality of carriers each include at least a single groove for receiving a rake finger of the rake assembly during removal of the designated mail piece from the carrier to the bin.

7. The system of claim 1 wherein each of the plurality of carriers include a sloped front end which shifts in the direction of travel of the carrier during movement of the carrier between levels.

8. The system of claim 1 wherein the rake assembly is movable between a raking position and a raised position.

9. The system of claim 1 wherein each of the plurality of carriers includes a front sloped portion having a lip for diminishing effects of air on the mail piece during transport.

10. A method for sorting mail pieces, the method comprising the steps of:
    providing a first pair of sprockets secured at a predetermined distance therebetween having a first transport chain mounted to rotate thereon;
    providing a second pair of sprockets secured at the predetermined distance therebetween having a second transport chain mounted to rotate thereon wherein the second pair of sprockets is longitudinally and laterally displaced, but not vertically displaced, from the first pair of sprockets;
    feeding the mail pieces onto a plurality of carriers wherein each of the plurality of carriers is horizontally secured and maintained between the first transport chain and the second transport chain to hold at least one mail piece;
    transporting the mail pieces on each of the plurality of carriers wherein the transporting occurs on two horizontal planes defined by the orientation of the first pair and the second pair of sprockets and the first and second transport chains, respectively;
    removing one of the mail pieces from the plurality of carriers into at least one of a plurality of bins during transport wherein each of the mail pieces is designated for a specific bin; and
    sensing level of fill of each of the plurality of bins.

11. The method of claim 10 further comprising the step of:
    removing the bin upon sensing of a full condition.

12. The method of claim 11 further comprising the step of:
    replacing automatically the bin removed with a new bin.

13. A method for sorting mail pieces, the method comprising the steps of:
    providing a first pair of sprockets secured at a predetermined distance therebetween having a first transport chain mounted to rotate thereon;
    providing a second pair of sprockets secured at the predetermined distance therebetween having a second transport chain mounted to rotate thereon wherein the second pair of sprockets is longitudinally and laterally displaced, but not vertically displaced, from the first pair of sprockets;

feeding the mail pieces onto a plurality of carriers wherein each of the plurality of carriers is horizontally secured and maintained between the first transport chain and the second transport chain to hold at least one mail piece;

transporting the mail pieces on each of the plurality of carriers wherein the transporting occurs on two horizontal planes defined by the orientation of the first pair and the second pair of sprockets and the first and second transport chains, respectively;

removing one of the mail pieces from the plurality of carriers into at least one of a plurality of bins during transport wherein each of the mail pieces is designated for a specific bin;

providing at least one groove in each of the plurality of carriers; and providing at least one rake finger corresponding to the at least one groove in the carrier for removing the mail piece from the carrier during transporting of the mail pieces.

* * * * *